United States Patent
Ramakrishnan et al.

(10) Patent No.: US 9,881,005 B2
(45) Date of Patent: *Jan. 30, 2018

(54) LANGUAGE INDEPENDENT PROCESSING OF LOGS IN A LOG ANALYTICS SYSTEM

(71) Applicant: International Business Machines Corporation, Armonk, NY (US)

(72) Inventors: Arun Ramakrishnan, Chennai (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,184

(22) Filed: Sep. 4, 2014

(65) Prior Publication Data

US 2015/0149148 A1    May 28, 2015

Related U.S. Application Data

(63) Continuation of application No. 14/090,053, filed on Nov. 26, 2013.

(51) Int. Cl.
G06F 17/28    (2006.01)

(52) U.S. Cl.
CPC ........ *G06F 17/2872* (2013.01); *G06F 17/289* (2013.01)

(58) Field of Classification Search
CPC . G06F 8/51; G06F 9/4448; G06F 8/20; G06F 11/0766; G06F 17/2872;

(Continued)

(56) References Cited

U.S. PATENT DOCUMENTS 5,572,670 A     11/1996   Puckett
6,292,772 B1 *   9/2001   Kantrowitz ........... G06F 17/275
                                                            382/230

(Continued)

FOREIGN PATENT DOCUMENTS

CN          1834955 A      9/2006
CN        102651003 A      8/2012

(Continued)

OTHER PUBLICATIONS

IBM, "IBM Content Analytics—United States", reference provided in search report Jun. 27, 2013, downloaded on Sep. 9, 2013, <http://www-01.ibm.com/software/globalization/topics/languageware/>.

(Continued)

*Primary Examiner* — Michael Colucci
(74) *Attorney, Agent, or Firm* — Steven F. McDaniel; David B. Woycechowsky

(57) ABSTRACT

Log files include log file content, some of which (especially a non-runtime portion) is in human-readable language. Translation of log file content is accomplished by: (i) generating first log content in a first human-readable language using a first resource bundle related to data translation; and (ii) translating the first log content to second log content, which corresponds to the first log content but is in a second human-readable language, using the first resource bundle. The translated log content may have annotations and/or processing rules applied to it. The translation of the present invention can help to keep the translation accurate and uniform so that the translated log content may be more effectively used in various ways.

3 Claims, 3 Drawing Sheets

(58) Field of Classification Search
CPC ...... G06Q 10/06; G06Q 10/087; G06Q 10/10; G06Q 10/20; G06Q 20/10; G06Q 30/02; G06Q 30/0222; G06Q 30/0283; G06Q 30/04; G06Q 30/06
USPC ......... 704/2, 4; 717/137, 124, 110; 715/273, 715/230; 709/225, 220; 707/769, 709
See application file for complete search history.

(56) References Cited

U.S. PATENT DOCUMENTS

| | | | |
|---|---|---|---|
| 6,826,591 B2 | 11/2004 | French et al. | |
| 6,981,031 B2 | 12/2005 | French et al. | |
| 6,999,916 B2* | 2/2006 | Lin | G06F 17/289 704/2 |
| 7,117,504 B2* | 10/2006 | Smith | G06F 8/20 709/201 |
| 8,032,860 B2* | 10/2011 | Piehler | G06F 17/21 717/110 |
| 8,122,106 B2* | 2/2012 | Hunt | G06F 8/65 703/13 |
| 8,190,718 B1* | 5/2012 | Bishara | G06F 8/51 709/220 |
| 8,200,818 B2* | 6/2012 | Freund | H04L 63/0263 709/203 |
| 8,296,125 B2* | 10/2012 | Shetty | G06F 9/4448 704/2 |
| 2002/0038386 A1* | 3/2002 | Bhatia | G06F 17/3087 709/250 |
| 2002/0165885 A1 | 11/2002 | Kumhyr et al. | |
| 2003/0131320 A1 | 7/2003 | Kumhyr et al. | |
| 2004/0186857 A1* | 9/2004 | Serlet | G06F 17/30141 |
| 2004/0216044 A1* | 10/2004 | Martin | G06F 8/10 715/273 |
| 2006/0174196 A1* | 8/2006 | Zhang | G06F 9/4448 715/236 |
| 2007/0053513 A1* | 3/2007 | Hoffberg | G06K 9/00369 380/201 |
| 2008/0103758 A1* | 5/2008 | Venkateswarlu | G06F 9/4448 704/2 |
| 2008/0120129 A1* | 5/2008 | Seubert | G06Q 10/06 705/35 |
| 2009/0030944 A1* | 1/2009 | Ni | G06Q 10/107 |
| 2009/0132232 A1* | 5/2009 | Trefler | H04L 67/02 704/2 |
| 2009/0300774 A1* | 12/2009 | Makkinejad | G06F 21/629 726/27 |
| 2010/0306249 A1* | 12/2010 | Hill | G06F 17/30867 707/769 |
| 2010/0332216 A1* | 12/2010 | Williams | G06F 17/2872 704/4 |
| 2011/0196854 A1* | 8/2011 | Sarkar | G06F 17/30616 707/709 |
| 2011/0246964 A1 | 10/2011 | Cox et al. | |
| 2012/0066556 A1* | 3/2012 | Dufour | G06F 11/0712 714/49 |
| 2012/0192058 A1* | 7/2012 | Hagelund | G06F 9/4448 715/230 |
| 2012/0271828 A1 | 10/2012 | Raghunath | |
| 2013/0125098 A1* | 5/2013 | Dhoolia | G06F 8/51 717/137 |
| 2015/0052500 A1* | 2/2015 | Herron | G06F 11/3684 717/124 |

FOREIGN PATENT DOCUMENTS

| | | |
|---|---|---|
| CN | 103379140 A | 10/2013 |
| CN | 104679642 A | 6/2015 |

OTHER PUBLICATIONS

U.S. Appl. 14/090,053, entitled "Language Independent Processing of Logs in a Log Analytics System", filed Nov. 26, 2013.

* cited by examiner

LANGUAGE INDEPENDENT PROCESSING OF LOGS IN A LOG ANALYTICS SYSTEM

BACKGROUND OF THE INVENTION

The present disclosure relates generally to the field of analyzing logs to yield meaningful insights and/or data.

In computing, a log is a file that records events taking place in the execution of a system in order to provide an audit trail that can be used to: (i) understand the activity of the system; and/or (ii) diagnose problems. Conventionally, logs can help people develop insight into the activities of complex computer systems, particularly in the case of applications with little user interaction (such as server applications). Sometimes log file entries from multiple sources are considered combined. This approach, in combination with statistical analysis, may yield correlations between seemingly unrelated events on different servers. Many operating systems and computer programs include some form of logging subsystem.

Logs may be voluminous and/or presented in a form and format that is difficult to understand. Conventionally, these logs are subjected to "log analysis" in order to help gain insights from them. This is often conventionally done using special log analysis software.

Most databases maintain some kind of transaction log. Unlike the logs described above, these logs are not mainly intended as an audit trail for later analysis, and are not (easily) human-readable. Instead, they record changes to the stored data to allow the database to recover from crashes or other errors and maintain the stored data in a consistent state. Most database systems have both a log in the general sense described above, and a transaction log. Log files are globalized content and applications typically generate logs in the language local at the location of the system in which the application is running. This helps administrators read the log files in the local language. Conventionally, content and/or knowledge, associated with log analysis, is built based on the languages that the application supports in order to be able to process the logs consistently across all languages. Log analytics or stream-based analytics systems typically use: (i) annotations that run rules to extract useful and/or relevant information from the log; (ii) annotations that run rules to identify patterns and add additional information to content being processed; and (iii) evaluation rules that identify patterns and detect particular situations that might be of interest from a problem analysis scenario.

A "resource bundle" is a file that contains locale-specific data that is helpful for using a generic piece of software specifically in a certain locale. It is a way of "internationalizing" a generic piece of software by making the code locale-independent. Extracting locale-sensitive objects such as strings from the code (as opposed to hard-coding them) means that: (i) the application can handle multiple locales without having to write different code for each locale; and (ii) human translators can deal with just the translatable text and not the programming code. It is known to provide logging software with one or more resource bundles. Conventionally, these resource bundles are used to generate the non-runtime portion of the content of the log in a local language. Herein, "non-runtime" means system/environment independent, which is to say log content strings that are mostly static and designed at development time. On the other hand, run-time log content values and/or strings are related to the environment or runtime (to name some examples, hostname, ip (Internet protocol) address, environment variable value, program runtime values). The runtime values can be numerical or non-numerical in nature. However, the non-runtime values generally include text that people expect to be presented in their preferred human-readable language.

SUMMARY

According to an aspect of the present invention, there is a computer program product, a system and a method including the following steps (not necessarily in the following order): (i) generating first log content in a first human-readable language using a first resource bundle related to data translation; and (ii) translating the first log content to second log content, which corresponds to the first log content but is in a second human-readable language, using the first resource bundle.

DETAILED DESCRIPTION

Figure 1:
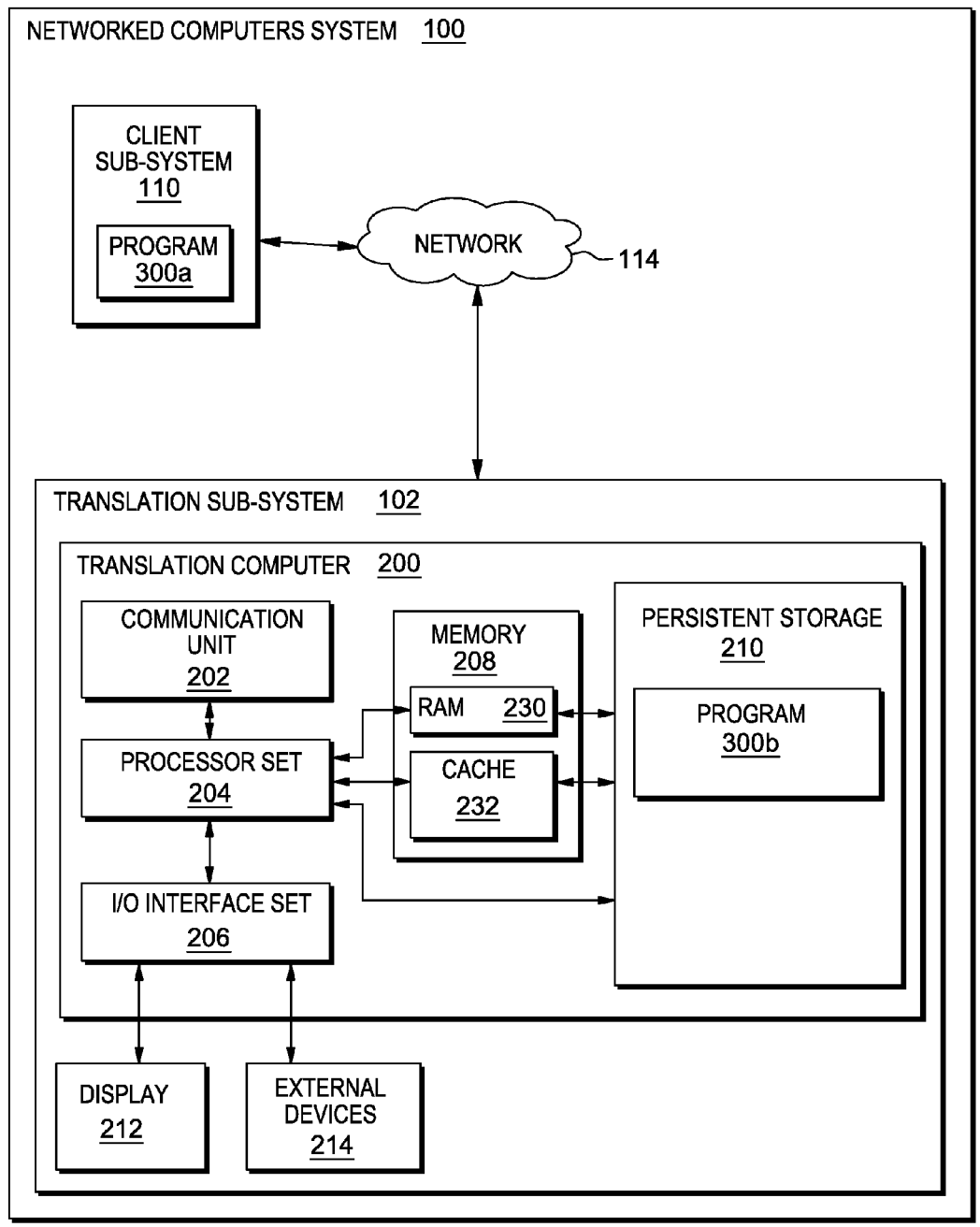
FIG. 1 is a schematic view of a first embodiment of a system according to the present invention.

Some embodiments of the present disclosure translate the log content using the message bundles or resource bundles used to generate the log content. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

An embodiment of a possible hardware and software environment for software and/or methods according to the present invention will now be described in detail with reference to the FIG. 1, which is a block diagram illustrating networked computers system 100, including: translation sub-system 102; client sub-system 110 (which includes program 300a); and communication network 114. Translation sub-system 102 includes translation computer 200; display 212; and external device set 214. Translation computer 200 includes: communication unit 202; processor set 204; input/output (i/o) interface set 206; memory device 208; persistent storage device 210; random access memory (RAM) devices 230; cache memory device 232; and program 300b. Translation sub-system 102 is, in many respects, representative of the various computer sub-system(s) in the present invention and will now be discussed in some detail.

Translation computer may be a mainframe computer, a laptop computer, a tablet computer, a netbook computer, a personal computer (PC), a desktop computer, a personal digital assistant (PDA), a smart phone, or other computer (see definition of "computer", below in the Definitions sub-section of this Detailed Description section). Program 300b is a collection of machine-readable instructions and/or data that is used to create, manage and control certain software functions that will be discussed in detail, below, in the Example Embodiment sub-section of this Detailed Description section.

Translation sub-system 102 is capable of communicating with other computer sub-systems, such as client sub-system 110 and its program 300a, through network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between computers.

System 100 is only one possible implementation and does not imply any limitations with regard to the environments in which different embodiments may be implemented. Many modifications to the depicted environment may be made, especially with respect to current and anticipated future advances in cloud computing, distributed computing, smaller computing devices, network communications and the like.

Translation sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300b is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage 210.

Program 300b may include both machine-readable and performable instructions and/or substantive data (that is, the type of data stored in a database). In this particular embodiment, persistent storage 210 includes a magnetic hard disk drive. To name some possible variations, persistent storage 210 may include a solid-state hard drive, a semiconductor storage device, a read-only memory (ROM), an erasable programmable read-only memory (EPROM), a flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-system 110. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with translation computer 200. For example, I/O interface set 206 provides a connection to external device set 214. External device set 214 will typically include devices such as a keyboard, a keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300b, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
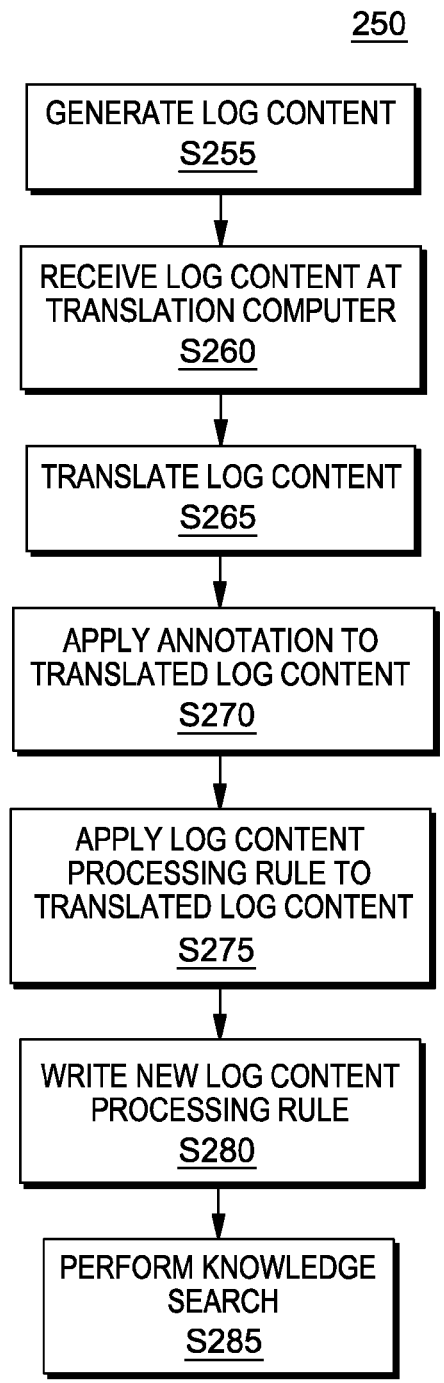
FIG. 2 is a flowchart showing a method performed, at least in part, by the first embodiment computer system.
Figure 3:
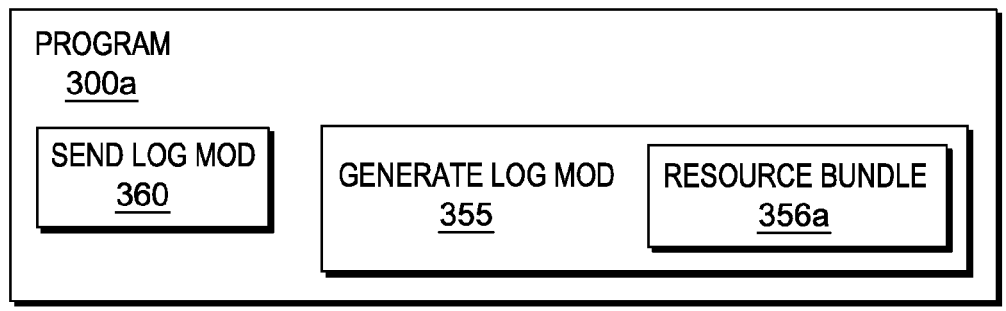
FIG. 3 is a schematic view of a portion of the first embodiment system.
Figure 4:
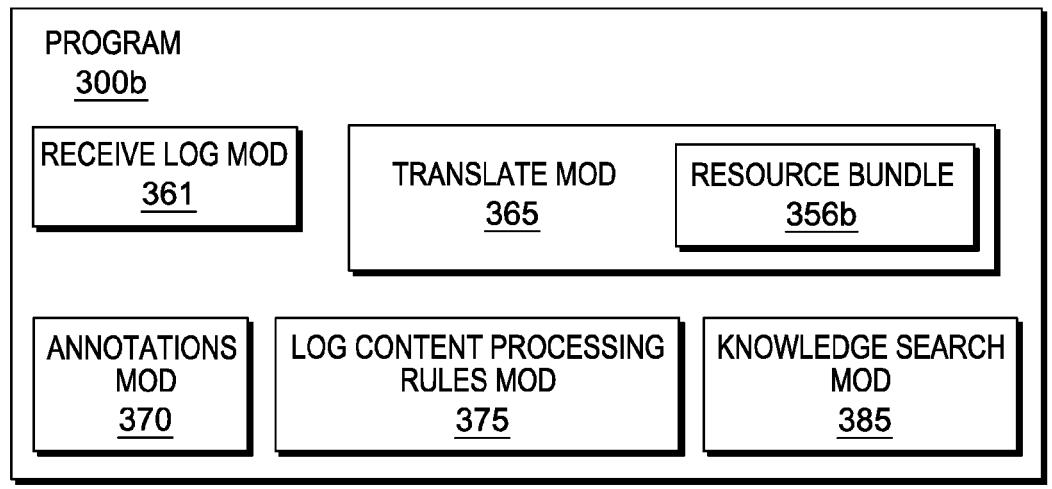
FIG. 4 is a schematic view of another portion of the first embodiment system.

FIG. 2 shows a flow chart 250 depicting a method according to the present invention. FIG. 3 shows program 300a for performing at least some of the method steps of flow chart 250. FIG. 4 shows program 300b for performing at least some of the method steps of flow chart 250. This method and associated software will now be discussed, over the course of the following paragraphs, with extensive reference to FIG. 2 (for the method step blocks) and FIGS. 3 and 4 (for the software blocks).

Processing begins at step S255 where generate log module ("mod") 355 of program 300a of client sub-system 110 (see FIG. 1) generates first log content. In this example, the first log content is the content (both numerical and verbal) of a single log file. The verbal portion of the first log content is generated, at least in part, by resource bundle 356a. Resource bundle 356a is a data translation resource bundle, which allows the log content to be generated in one of many human-readable languages. Even though resource bundle 356a is shown as being part of generate log mod 355, those of skill in the art in the area of resource bundle programming will appreciate that the resource bundle is separate from the main body of software that generates the log. In this example, the first log content is generated in a first human-readable language that corresponds to the prevalent spoken language in the locale of client sub-system 110. The log relates to the operational performance and/or status of the computer(s) of client sub-system 110, and may become a matter of heightened interest and/or forensic review if client sub-system 110 is behaving abnormally or crashes.

Processing proceeds to step S260 where send log mod 360, of program 300a, and receive log mod 361, of program 300b, effect communication of the first log content from client sub-system 110 to receive log mod 361 of program 300b of translation computer 200 (see FIG. 1). As it turns out, translation computer 200 is in a locale with a different prevalent spoken language (that is, a second human-readable language) than the prevalent spoken language of client sub-system 110 (that is, the first human-readable language). This means that it will be difficult, or impossible, for human workers at translation sub-system 102 to directly review the first log content. Also, the log processing rules, annotation and knowledge search data store local to translation subsystem are written in the second human-readable language, which means that these tools cannot be effectively and directly applied to the first log content.

Some alternatives and/or variations on the example of FIGS. 1 to 4 will now be discussed. The translation computer could be in a different locale or the translation module could be configured to translate to a second locale not necessarily the locale on which the translation module is running. Also, the translation module could be instructed (through configuration-runtime or static) to translate to multiple languages. This is particularly useful when log processing rules might exist in multiple languages or/and annotations, etc. could be in different languages in which case the log content arriving needs to be translated to all the languages in which the rules/policies/annotations/search etc. have been written to ensure that all of them are applied or run. To facilitate this, the annotation/rule/policy/search etc. are associated with a locale and the list of locales are communicated to or configured in the translation module which then performs the translations using that instruction. There might be a mechanism that also routes the translated content to the right module/annotator/search module or other component based on the language to optimize the flow.

Processing proceeds to step S265, where translate mod 365 of program 300b translates the first log content into second log content using resource bundle 356b. Second log content corresponds, in substance, to the first log content, but the second log content is in the second human-readable language, rather than the first human-readable language. Resource bundle 356b, which translates the first log content, is identical to resource bundle 356a, which helped to generate the verbal portion of the first log content back at step S255.

Processing proceeds to step S270 where annotations mod 370 applies an annotation to the second log content. Because of the translation at step S265, both the annotation and the second log content are in the same second human-readable language.

Processing proceeds to step S275 where Log Content Processing Rules Mod 375 applies a first log processing rule to the second log content. Because of the translation at step S265, both the first log processing rule and the second log content are in the same second human-readable language. The application of the first log processing rule serves to analyze the second log content in some manner. Some examples of types of log content processing rules are discussed, below, in the Further Comments And/Or Embodiments sub-section of this Detailed Description section.

Processing proceeds to step S280 where Log Content Processing Rules mod 375 allows a human user to write a new rule, herein called a second log processing rule based on observations of the second log content. Because of the translation at step S265, the human writer of the rule can understand the second log content, thereby allowing her to use her skill and insight to write the second log content processing rule in the second human-readable language, which is her preferred language.

Processing proceeds to step S285, where knowledge search mod 385 performs a knowledge search based on a portion of the second log content. The knowledge search data store (not separately shown) of the knowledge search mod is in the second human-readable language meaning that the translated second log content can be used effectively with mod 385.

III. Further Comments and/or Embodiments

Some embodiments of the present disclosure translate log content of a log using a resource bundle that was used to generate the log in the first place. In a simple example, assume that the text below is in a log called "systemout.log". The log content of the systemout.log log, in the English language, is as follows:

[8/23/13 17:16:55:663 IST] 00000093 AdminHelper A ADMN1010I: An attempt is made to stop the admin application. (User ID=defaultWIMFileBasedRealm/smadmin)

[8/23/13 17:16:55:991 IST] 00000093 CompositionUn A WSVR0192I: Stopping composition unit WebCube: cuname=admin in BLA WebCube:blaname=admin.

[8/23/13 17:16:56:288 IST] 00000093 ApplicationMg A WSVR0217I: Stopping application: admin

[8/23/13 17:17:08:221 IST] 00000093 servlet I com.computercompany.ws.webcontainer.servlet.ServletWrapper doDestroy SRVE0253I: [admin] [/admin] [CSPInterfaceServlet]: Destroy successful.

[8/23/13 17:17:16:344 IST] 00000093 ApplicationMg A WSVR0220I: Application stopped: admin

[8/23/13 17:19:25:538 IST] 00000093 CompositionUn A WSVR0193I: Composition unit WebCube: cuname=admin in BLA WebCube:blaname=admin stopped.

[8/23/13 17:19:37:815 IST] 00000114 AdminHelper A ADMN1008I: An attempt is made to start the admin application. (User ID =defaultWIMFileBasedRealm/smadmin)

[8/23/13 17:19:40:017 IST] 00000114 CompositionUn A WSVR0190I: Starting composition unit WebCube: cuname=admin in BLA WebCube:blaname=admin.

[8/23/13 17:19:46:328 IST] 00000114 ApplicationMg A WSVR0200I: Starting application: admin

[8/23/13 17:19:46:328 IST] 00000114 ApplicationMg A WSVR0204I: Application: admin Application build level: Unknown In the above example log content, the non-runtime strings that are generated, and later translated, by the resource bundle are as follows (in order of their occurrence): "An attempt is made to stop the admin application"; "User ID"; "Stopping composition unit"; "Stopping application"; "Destroy successful"; "Application stopped"; "An attempt is made to start the admin application"; "User ID"; "Starting composition unit"; "Starting application"; "Application"; and "Application build level".

Some embodiments of the present disclosure recognize that most of conventional log analysis, and analytics, related processing relies on rules written to identify text coming in as part of the log files, which, in turn, this makes the analysis/analytics software language dependent, which, in turn, results in the system being unable to process the logs when the logs are in a language not supported by the rules.

Some embodiments of the present disclosure may include one, or more, of the following features, characteristics and/or advantages: (i) translate log file content using resource bundles used to translate the logs; (ii) ensure that the log content, when translated, looks identical to what it would have looked if it would have been generated in that locale; (iii) tag the annotations and log processing rules with locale information specifying what language it supports; (iv) are able to translate the log to the language that the annotations support, while processing; (v) log content in any supported language can be processed by the log processing system; (vi) provide effective communication in scenarios where a customer's environment includes multiple locales; (vii) a standard set of annotations can be applied across multiple locations in a multiple-location customer environment; (viii) avoid use of translation services, which typically changes the order, or language usage, in the translated text making it difficult, or impossible, to write rules or patterns based upon the log content.

Some embodiments of the present disclosure may include one, or more, of the following characteristics, features and/or advantages: (i) identify the language of the log content that annotations; (ii) use machine logic-based rules to process the log content and associate it with resource/message bundles that can then be used to translate the log content; (iii) perform the processing and/or translation (mentioned in item (ii)) "on the fly", in "real time", and/or without latency that would be considered as significant to a human user; (iv) associate data translation (resource/message) bundles with annotations/processing rules; (v) use of Annotations/Tokenizer rules to identify the language that they can handle and they are also associated with the message/resource/translation bundles that can be used to translate the log files before applying the annotations to them; (vi) identify the language in which the log content is being generated (for example, this be through user input or by automatic detection of the locale of the system in which the log is being generated; and/or (vii) invoke translation of log records using the associated message bundles ("message bundles" and "resource bundles" are herein used interchangeably).

In some embodiments, the message bundles are used to translate the non-runtime portions of log records to a language of the target locale and the rules are evaluated as if the log content was generated in the locale that the rule is expected it to be in. Each of the annotations goes ahead and either updates the original record with the transformed content or extracted information or identified situation or uses the translated record instead to do so depending on the user preference.

In some embodiments, there will be correlation of logs across languages. In these embodiments, the system translates the log records to a language that is understood by the correlation engine logic/rules (as specified above) and performs the correlation in a language that is common across all the logs.

In some embodiments, there is translation of log records to the language of a locale requested by the user for display.

In some embodiments, the translatable content in the processed log record content can further be translated to the language of a locale that the user wants to see it in based on his locale preferences. In these embodiments, the system translates the log records as per the user's requirement and the output looks exactly as if the log was generated in a locale that the user selected.

Some embodiments include a central log translations service. In these embodiments, the system also allows for a centralized log translation service which receives the different languages in which the rules and annotations have been provided for a log file/type or system and translates the log record to those languages. This allows the processing of rules in a language with which a given rule writer is comfortable.

Some embodiments of the present disclosure include a knowledge search in a language that is: (i) relatively common; and/or (ii) user specified. While log content is being used to search a data store of related knowledge of solutions to problems by user, the system allows for the searches to be performed in the most common language that the user has configured or that knowledge is available in by performing the translation of the log record on the fly before the search or by using the log translation service. This language could also be specified by the user and can be configured.

Some embodiments of the present disclosure may include one, or more, of the following features, characteristics and/or advantages: (i) using message bundles to translate log content (and especially non-runtime, text-based portions of log content, multiple variations are documented) to a target language in which pre-existing log content rules are written; (ii) the predictable translation provided by using the message bundles for translation allows creation of annotation and tokenization rules (and/or other log content processing rules) in a single language (that is, the rule language), with the assurance that the log content rules can be reliably applied to a log that was originally generated in a language other than the rule language; (iii) provides language independent processing in an analytics system; and/or (iv) provides an exact translation as if the content was generated by the source program running in a target locale.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention", is tentative and provisional and subject to change over the course of patent prosecution as relevant information is developed and as the claims are potentially amended.

Embodiment: see definition of "present invention" above—similar cautions apply to the term "embodiment".

and/or: inclusive or; for example, A, B, "and/or" C means that at least one of A or B or C is true and applicable.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine-readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, and application-specific integrated circuit (ASIC) based devices.

Ancillary log-related material: any material that includes at least one of the following: a log annotation or a log content processing rule.

What is claimed is:

1. A computer implemented method comprising:
receiving, from a first system, and by a correlation engine that uses a log entry language, a first log entry generated in response to a system error, where the first log entry is written in a first language;
receiving, from a second system, and by the correlation engine, a second log entry generated in response to the system error, where the second log entry is written in a second language;
on condition the log entry language is different than the first language, translating the first log entry to the log entry language;

on condition the log entry language is different than the second language, translating the second log entry to the log entry language;
applying an annotation to the first log entry to identify a characteristic of the first log entry;
applying an annotation to the second log entry to identify a characteristic of the second log entry;
correlating the first log entry with the second log entry based on the annotations applied respectively to the first log entry and the second log entry;
responsive to correlating the first log entry with the second log entry:
  determining, by an analytics engine, a cause of the system error,
  generating, by the analytics engine, a first message,
  generating, by the analytics engine, a second message,
  sending the first message to the first system, and
  sending the second message to the second system.

2. The method of claim 1, wherein the first message instructs the first system as to how to correct the system error.

3. The method of claim 1, wherein the second message instructs the second system to retry an operation that precipitated the system error.

* * * * *